W. HOMMEL & H. T. DURANT.
EXTRACTION OF METALS FROM THEIR ORES.
APPLICATION FILED JUNE 25, 1910.
1,009,750.
Patented Nov. 28, 1911.
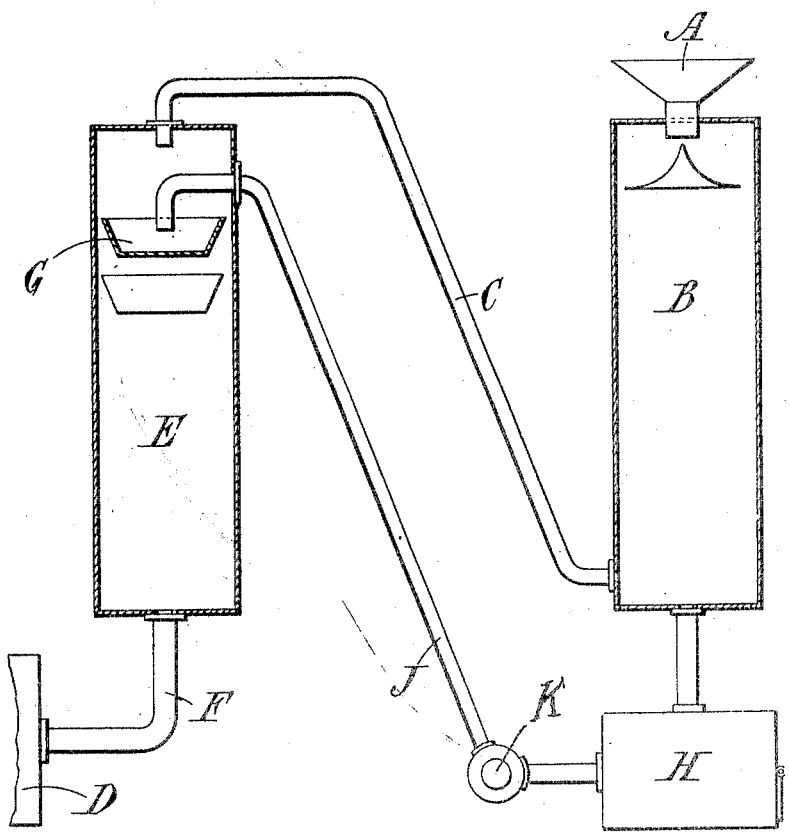

UNITED STATES PATENT OFFICE.

WOLDEMAR HOMMEL AND HENRY THOMAS DURANT, OF LONDON, ENGLAND, ASSIGNORS TO THE METALS EXTRACTION CORPORATION LIMITED, OF LONDON, ENGLAND.

EXTRACTION OF METALS FROM THEIR ORES.

1,009,750.  Specification of Letters Patent.  Patented Nov. 28, 1911.

Application filed June 25, 1910. Serial No. 568,904.

*To all whom it may concern:*

Be it known that we, WOLDEMAR HOMMEL, Ph. D., a citizen of the Swiss Confederation, and HENRY THOMAS DURANT, a subject of the King of England, both residing in London, England, have invented certain new and useful Improvements in the Extraction of Metals from Their Ores, of which the following is a specification.

This invention relates to improvements in the extraction of metals from their ores, and has special reference to the extraction of zinc and copper from their ores, by means of sulfurous acid.

More particularly the invention refers to the extraction of such metals from sulfid ores.

A method of treating ores according to this invention for extracting metals such as zinc or copper, consists in subjecting a solution of the metal to the action of a hot gas to precipitate the metal or a compound thereof, thereafter bringing the cooled resultant gas into contact with a mixture of ore and water to effect a solution of the metal.

More particularly this invention consists in subjecting a mixture of the roasted ore and water to the action of sulfurous acid gas escaping from the ore roasting furnace and previously cooled, collecting the sulfite solution of zinc or copper thus formed and submitting it to the action of hot gases from the roasting furnace, the furnace gases being thereby cooled and enriched by the addition of the sulfurous acid driven off from the sulfite solutions and zinc monosulfite or metallic copper being precipitated.

This invention also has reference to apparatus for carrying out the above or other processes in which a cold gas is brought into contact with a flowing mixture consisting of a mixture of ore and water, to effect a solution, after which the liquid solution is treated with hot gases to effect a precipitation. The apparatus comprises a roasting furnace, a precipitating tower communicating therewith in which the sulfite solution is subjected to the action of the escaping hot gases from the roasting furnace and the extraction tower communicating with the precipitating tower wherein the cooled gases are caused to act upon a mixture of ore and water passing through the extraction tower.

The accompanying drawing is a diagram in elevation and partly in section showing one form of apparatus suitable for carrying this invention into effect.

A is a feed hopper for ore and water.

B is a solution tower of any well known form suitable for bringing solids, liquids and gases into intimate contact.

C is a conduit for introducing sulfurous acid gas at the bottom of the tower B.

D is a roasting furnace of any form customarily used for roasting sulfid ores so as to yield sulfurous acid gas.

E is a precipitating tower of any well known kind in which a hot gas is brought into contact with a liquid so as to transfer heat from the gas to the liquid.

F is a conduit to lead hot furnace gases (containing $SO_2$) from the furnace to the bottom of the tower E.

H is a decanting apparatus connected to the bottom of the solution tower B and arranged to receive the discharge from the tower B and to separate the liquid portion from the solid portion.

J is a conduit through which the liquid from the decanting vessel H is conducted to the precipitating tower E.

K is a centrifugal pump to convey the liquid from the decanting vessel H through the conduit J to the tower E. The liquid is caused to trickle over baffles which may take the form of open tanks G disposed within the tower E, by which the liquid may be exposed to the action of the gas in the tower E.

This invention will now be described in its application to the extraction of zinc from complex sulfid ores reference being made to the accompanying drawing.

The roasted ore is mixed with water and is introduced through the feed hopper A to a solution tower B where it is brought into contact with a gas containing sulfurous acid produced as hereinafter described. The sulfurous acid gas and the water react with the roasted ore so as to dissolve the zinc therefrom in the form of zinc bisulfite solution. The contents of the solution tower B are discharged into a decanting device H in which the insoluble residue settles out of the solution of zinc bisulfite. This solution of zinc bisulfite is drawn off from the decanting vessel H by means of a centrifugal pump K and is passed through the conduit J into the precipitating tower E. From the conduit J the solution runs on to the baffles G and trickles down through the tower E through which the hot gases delivered from the roasting furnace D through the conduit F are passing in an upward direction. The contact of the zinc bisulfite solution with the hot gases from the furnace has two results. The liquid added cold removes the heat from the gases and it passes out of the tower E through the conduit C in a cooled state. It is essential for the solution of zinc in the form of bisulfite, that the sulfurous acid gas employed should be cooled, and the method above described affords the required supply of cooled gas. The other important operation which takes place in the tower E is that the furnace gases, being very hot, have the effect of breaking up the solution of zinc bisulfite and of expelling sulfurous acid gas therefrom. By this means the zinc bisulfite is converted into zinc monosulfite which latter may be easily precipitated, collected and roasted in a calcining furnace to produce zinc oxid. It will be seen that the hot furnace gases are not only cooled but the sulfurous acid gas escaping from the bisulfite solution enriches the furnace gases which are then passed in their cooled and enriched state to the extracting tower B for the treatment of fresh quantities of roasted ore and water.

This process possesses many commercial advantages among which the following are the most prominent:—It is always necessary to cool the gases before they can be used for extraction, and the heat which is usually wasted is now used to convert the zinc bisulfite into monosulfite. The furnace gases are at once enriched in sulfurous acid and the extraction is thereby enormously facilitated; also it is made possible to use gases poorer in sulfurous acid and to treat ores which originally did not contain sufficient sulfur.

In the above described process reference has been made all through to the treatment of zinc, although it is to be understood that copper could be extracted from its ores by exactly the same process. The treatment of the sulfite solution of copper however will result in the precipitation of metallic copper.

It is within this invention to treat copper ores such as malachite ore (carbonate of copper) or a copper slag; such materials not containing sulfur would go after crushing direct to the towers and the sulfur or sulfite ore to give the necessary sulfurous acid gases from the roasting furnace could be obtained from any other source such as roasting ores which do not require to go through this particular extraction process after roasting.

Although one particular method of carrying out this invention has been described modifications may be made provided that the spirit of the invention is not departed from.

What we claim as our invention and desire to secure by Letters Patent is:—

The herein described cyclic process for the extraction of zinc from its sulfid ores in which the only reagents employed are water and those supplied by the ore itself which consists in roasting the ore to drive off gases containing sulfurous acid cooling said gases and bringing them in contact with a mixture of the roasted ore and water to effect the solution of the zinc as sulfite and thereafter submitting said sulfite solution to the action of the hot gases from the ore roasting furnace whereby insoluble zinc monosulfite is precipitated, the said hot gases being enriched in sulfurous acid and cooled ready for the further treatment of the mixture of roasted ore and water.

In testimony whereof we have signed our names to this specification in the presence of two subscribing witnesses.

WOLDEMAR HOMMEL.
HENRY THOMAS DURANT.

Witnesses:
  PERCY HEWITT,
  H. D. JAMESON.